United States Patent [19]

Irvin et al.

[11] 3,901,840

[45] Aug. 26, 1975

[54] THERMOSETTING ACRYLIC ENAMEL CONTAINING AN ACRYLIC POLYMER AND BUTYLATED MELAMINE FORMALDEHYDE RESIN

[75] Inventors: Robert A. Irvin, Silver Springs, Md.; William H. Meredith, Flint, Mich.

[73] Assignee: E. I. Du Pont de Nemours and Company, Wilmington, Del.

[22] Filed: Sept. 26, 1973

[21] Appl. No.: 401,071

Related U.S. Application Data

[63] Continuation-in-part of Ser. No. 241,442, April 5, 1972, abandoned.

[52] U.S. Cl. ............................. 260/29.1 R; 260/851
[51] Int. Cl.$^2$ ......................................... C08L 25/14
[58] Field of Search ....................... 260/29.1 R, 851

[56] References Cited

UNITED STATES PATENTS 3,438,800    4/1969    Johnson .......................... 260/851 X

*Primary Examiner*—Melvyn I. Marquis
*Assistant Examiner*—S. M. Person

[57] ABSTRACT

The thermosetting acrylic enamel coating composition contains the following film-forming constituents:

1. an acrylic polymer of styrene and methyl methacrylate, an alkyl acrylate, a hydroxyalkyl methacrylate or a hydroxyalkyl acrylate and an $\alpha,\beta$-unsaturated carboxylic acid; and
2. a butylated melamine formaldehyde resin;

the novel coating composition provides a one-coat high-quality finish for automobile and truck bodies.

4 Claims, No Drawings

THERMOSETTING ACRYLIC ENAMEL CONTAINING AN ACRYLIC POLYMER AND BUTYLATED MELAMINE FORMALDEHYDE RESIN

CROSS REFERENCE TO RELATED APPLICATIONS

This application is a continuation-in-part of my co-pending application Ser. No. 241,442, filed Apr. 5, 1972, and now abandoned.

BACKGROUND OF THE INVENTION

This invention relates to a thermosetting acrylic enamel and, in particular, to a thermosetting acrylic enamel that provides a high quality finish for the exterior of automobile and truck bodies.

Thermosetting acrylic enamels are well known in the art as shown by Frazier et al., U.S. Pat. No. 2,681,897, issued June 22, 1954; Vasta U.S. Pat. No. 3,338,860; issued Aug. 29, 1967; Fisk et al., U.S. Pat. No. 3,365,414, issued Jan. 23, 1968; Vasta U.S. Pat. No. 3,622,651, issued Nov. 23, 1971; and Parker U.S. Pat. No. 3,637,546, issued Jan. 25, 1972. These acrylic enamels form excellent finishes. Acrylic lacquers modified with melamine formaldehyde resins are disclosed in Kao U.S. Pat. No. 3,634,347, issued June 11, 1972. However, there is a need in the automobile and truck manufacturing industry for a one-coat thermosetting acrylic enamel which will provide a high quality finish.

The novel thermosetting acrylic enamel coating composition of this invention utilizes a particular acrylic polymer in combination with a specific butylated melamine formaldehyde resin and the composition can be applied at substantially higher spray solids than the aforementioned prior art compositions. A single coat application is only required to give film thicknesses comparable to several coats of the prior art enamels.

SUMMARY OF THE INVENTION

The liquid thermosetting acrylic enamel coating composition of this invention comprises 10–50% by weight of film-forming constituents and correspondingly 95–50% by weight of a solvent for the film-forming constituents; wherein the film-forming constituents consist essentially of an incompatible blend of 1. 50–85% by weight, based on the weight of the film-forming constituents, of an acrylic polymer which consists essentially of
   a. 25–35% by weight, based on the weight of the acrylic polymer, of styrene;
   b. 17–27% by weight, based on the weight of the acrylic polymer, of methyl methacrylate;
   c. 35–40% by weight, based on the weight of the acrylic polymer, of a soft acrylic constituent of an alkyl acrylate having 2–8 carbon atoms in the alkyl group;
   d. 5–15% by weight, based on the weight of the acrylic polymer, of a hydroxy-containing constituent which is either a hydroxyalkyl methacrylate or a hydroxyalkyl acrylate or a mixture thereof in which the alkyl groups have 2-4 carbon atoms,
   e. 0.2–2% by weight, based on the weight of the acrylic polymer, of a $\alpha$-$\beta$ unsaturated carboxylic acid; wherein the acrylic polymer has an acid number of about 1–16 and a relative viscosity of about 1.04–1.15 measured at 25°C. in dichloroethane according to ASTM–D–445–46–T, Method B; and 2. 15–50% by weight, based on the weight of the film-forming constituent, of a butylated melamine formaldehyde resin in which the molar ratio of melamine/formaldehyde/butanol is ¼–6/1–3 and has a viscosity of 300–800 centistokes measured at 25°C. according to ASTM–D–1545–63.

DESCRIPTION OF THE INVENTION

The novel coating composition of this invention has a solids content of film-forming constituents of about 10–50% by weight and preferably about 30–45% by weight. The novel composition is usually pigmented and contains about 0.1–20% by weight of pigment.

The film-forming constituents of the novel coating composition comprise 50–85% by weight of acrylic polymer and correspondingly 15–50% by weight of the butylated melamine formaldehyde resin which is not compatible with the acrylic polymer. Preferably, the novel composition contains 60–80% by the acrylic resin and 40–20% by weight of the incompatible butylated melamine formaldehyde resin and more preferably about 70% by weight of the acrylic polymer is used in combination with about 30% by weight of the incompatible butylated melamine formaldehyde resin.

The acrylic polymer utilized in the novel composition of this invention is prepared by conventional polymerization techniques in which the monomer constituents are blended with a solvent and a polymerization catalyst and heated to about 75°–150°C. for about 2–6 hours to form a polymer that has a relative viscosity of about 1.04–1.15, preferably 1.06–1.10 and an acid number of about 1–16.

The relative viscosity is the value obtained by dividing the efflux time of a solution of the polymer by the efflux time of the solvent used to form the polymer solution. Efflux times are measured according to the procedure of ASTM–D–445–46–T, Method B, using as the polymer solution 0.25 gram of the polymer dissolved in dichloroethane to give 50 cc. of solution. The efflux times are measured at 25°C. in a standard apparatus, sold under the designation of a modified Ostwald viscometer.

Typical solvents which are used to prepare the acrylic polymers utilized in this invention are toluene, xylene, butyl acetate, acetone, methyl isobutyl ketone, methylethyl ketone, butyl alcohol, and other aliphatic, cycloaliphatic and aromatic hydrocarbons, esters, ethers, ketones, and alcohols such as are conventionally used in the preparation of polymers. Preferably a solvent is used in the preparation of the polymer that has a medium boiling range of about 130°–170°C. and preferably, contains 1–3% by weight of methanol and comprises aromatic hydrocarbons, oxygenated solvents such as acetone and the aforementioned ketones and can also contain a small amount of ethylene glycol monoethylether acetate. This preferred solvent mixture is utilized as a diluent in preparing the novel composition.

About 0.1–4% by weight, based on the weight of the monomer used to prepare the acrylic polymer, of the polymerization catalyst is utilized. Typical catalysts are azo-bis-isobutyronitrile, azo-bis-($\alpha,\gamma$-dimethylvaleronitrile), benzoyl peroxide, t-butylperoxypivalate, di-tert.-butyl peroxide, and the like.

The acrylic polymer contains 25–35% by weight of styrene in combination with 17–27% by weight of methyl methacrylate. The acrylic polymer contains 35–40% by weight of the soft acrylic constituent, preferably, an alkyl acrylate having 2–8 carbon atoms in the alkyl group. The following are typical soft acrylic monomers which can be utilized: ethyl acrylate, propyl acrylate, isopropyl acrylate, butyl acrylate, isobutyl acrylate, hexyl acrylate, 2-ethylhexyl acrylate, octyl acrylate. Butyl acrylate is the preferred soft acrylic constituent since it forms a high quality polymer that has excellent physical properties.

The acrylic polymer contains 5–15% by weight of a hydroxy containing constituent such a hydroxy alkyl acrylate or a hydroxy alkyl methacrylate or a mixture of these two compounds. These compounds contain 2–4 carbon atoms in the alkyl groups and are for example hydroxy ethyl acrylate, hydroxy propyl acrylate, hydroxy butyl acrylate, hydroxy ethyl methacrylate, hydroxy propyl methacrylate, and hydroxy butyl methacrylate.

The acrylic polymer also contains 0.2–2% by weight, based on the weight of the acrylic polymer, of an $\alpha$-$\beta$ unsaturated carboxylic acid. Typically useful acids are acrylic acid, methacrylic acid, crotonic acid, itaconic acid, propyl acrylic acid, and the like. Preferred are acrylic acid and methacrylic acid since these acids form high quality polymers useful in the novel composition of this invention.

Preferably the acrylic polymer used in the novel coating composition of this invention contains 25–35% by weight of styrene, 17–27% by weight of methyl methacrylate, 35–40% by weight of a soft acrylic constituent, preferably butyl acrylate, 5–15% by weight of the hydroxy containing constituent, preferably hydroxy ethyl acrylate or hydroxy propyl methacrylate, and 0.2–2% by weight of acrylic acid or methacrylic acid. These preferred acrylic polymers have a relative viscosity of about 1.06–1.10 and an acid number of about 1–16.

One particularly useful acrylic polymer which gives a high quality finish contains about 30% by weight of styrene, 22% by weight of methyl methacrylate, 37% by weight of butyl acrylate, 10% by weight of hydroxy ethyl acrylate and 1% by weight of acrylic acid and has an acid number of about 8–14 and a relative viscosity of about 1.07–1.08.

The novel coating composition of this invention contains 15–50% by weight, based on the weight of the film-forming constituents, of a butylated melamine formaldehyde resin and preferably about 20–40% by weight of this resin. The butylated melamine formaldehyde resin has a viscosity of about 300–800 centistokes measured at 25°C. according to ASTM–D–1545–63. The resin is prepared from the following ratio of constituents: melamine/formaldehyde/butanol in a molar ratio of ¼–6/1–3 with the preferred composition being a ratio of melamine/formaldehyde/butanol of 1.0/4.8/1.79 moles. The preferred butylated melamine formaldehyde resin has a viscosity of 377–700 centistokes measured at 25°C.

Plasticizers can be used in the novel coating composition of this invention in amounts up to 20% by weight of the film-forming constituents but preferably about 3–8% by weight of plasticizer is used. Polymeric plasticizers such as epoxidized soyabean oil, oil-free and oil-modified alkyds and polyesters such as polyphthalate esters, polyalkylene adipate esters of polyaryleneadipate esters can be used. Monomeric plasticizers can also be used such as the phthalate esters, like butylbenzylphthalate, dibutylphthalate, 2-ethylhexylbenzylphthalate, dicyclohexylphthalate, also, benzoates, glycolates, citrates, sebacates, phosphates and sulfonamides can also be utilized.

Generally the novel coating composition of this invention contains pigments in amounts of 0.1–20% by weight. A wide variety of pigments can be used such as metallic oxides, for example, titanium dioxide, iron oxide, zinc oxide, and the like, metal hydroxides, metal flakes, metal powders, chromates, sulfates, carbonates, carbon black, silica, talc, phthalocyanine blues and greens, indanthrone pigments, and other organic pigments and dyes.

The novel coating composition of this invention can be applied to metal substrates by any of the usual application methods such as spraying, electrostatic spraying, dipping, brushing, flow coating and the like. These coatings are baked about 125°–175°C. for about 5–40 minutes to provide a resulting finish which is about 1–5 mils thick and preferably 1–3 mils in thickness. The finish can be rubbed or polished in accordance with conventional techniques to improve smoothness or gloss or both.

The novel coating composition of this invention is preferably applied over a primed metal substrate. Typical alkyd primers and epoxy primers pigmented with iron oxide, carbon black, titanium dioxide can be used. The primer can be applied by electrodeposition or can be applied by conventional spraying or dipping of the metal substrate. Also, the novel composition can be used directly over galvanized steel to form a durable coating.

The novel composition of this invention can be applied directly over a primed metal substrate without the use of an intermediate sealer coat. However, a sealer coat can be used to provide a finish with excellent adhesion and smoothness. Typically useful sealer compositions are disclosed in Rohrbacher, U.S. Pat. No. 3,509,086, issued Apr. 28, 1970.

The finishes of the novel coating composition of this invention are characterized by an increased freedom from water spotting, have excellent craze resistance, outstanding durability, gloss retention and have a good gasoline resistance and resistance to aromatic solvents. These characteristics make the novel composition particularly attractive as an exterior finish for automobiles and trucks. Also, since the finish can be applied in a single application step, it makes the novel composition particularly attractive for use in mass production of automobiles and trucks.

The following examples illustrate the invention. The parts and percentages are by weight unless otherwise specified.

EXAMPLE 1

A coating composition is prepared by first forming the following acrylic polymer solution:

| Portion 1 | Parts By Weight |
|---|---|
| Petroleum naphtha solvent | 102.88 |
| Ethylene glycol monoethylether | 134.70 |
| Butanol | 20.08 |
| Portion 2 | |
| Styrene monomer | 146.93 |

| Portion 1 | Parts By Weight |
|---|---|
| Methyl methacrylate monomer | 107.76 |
| Butyl acrylate monomer | 181.23 |
| Hydroxyethylacrylate monomer | 48.96 |
| Acrylic acid | 4.90 |
| Ditertiary-butyl peroxide | 14.69 |
| Portion 3 | |
| Butyl acetate solution (90% butyl acetate in butanol) | 68.87 |
| TOTAL | 831.00 |

Portion 1 is charged into a reaction vessel equipped with a stirrer, a heating mantle, and a reflux condenser and then the solvents are heated to about 140°C. Portion 2 is premixed and added continuously over a four-hour period while maintaining the reaction mixture at its reflux temperature. The reaction mixture is maintained at reflux temperature for about an additional 2.5 hours and until a constant viscosity is reached. Portion 3 is then added and blended with the reaction mixture.

The resulting polymer has a solids content of about 60% and the polymer has a relative viscosity of about 1.08 measured at 25°C. in dichloroethane at about 0.5% polymer solids and the polymer has an acid number of about 9–11. The polymer has the following composition: styrene/methyl methacrylate/butyl acrylate/hydroxyethyl acrylate/acrylic acid in a weight ratio of about 30/22/37/10/1.0.

A white mill base is formed as follows:

| Portion 1 | Parts by Weight |
|---|---|
| Polymer solution (65% polymer solids of styrene/methylmethacrylate/butyl acrylate/hydroxyethyl acrylate/acrylic acid in a mole ratio of 30.0/18.5/40.0/10.0/1.5 dissolved in a solvent | 9.00 |
| Butyl acetate solution (described above) | 6.00 |
| Anhydrous isopropanol | 4.00 |
| Soya lecithin solution (soya lecithin in mineral spirits) | 0.50 |
| Portion 2 | |
| Titanium dioxide pigment | 63.00 |
| Portion 3 | |
| Polymer solution (described above) | 17.50 |
| TOTAL | 100.00 |

Portion 1 is charged into a vessel and mixed for fifteen minutes and then Portion 2 is added and mixed for thirty minutes and then Portion 3 is added and mixed for an additional thirty minutes. The resulting composition is then ground at one pass in a standard sand-grinding mill at a rate of 80 gallons per hour, using a maximum temperature of about 60°C. The resulting composition has a pigment-to-binder ratio of about 360/100.

The coating composition is then prepared by blending together the following ingredients:

| Portion 1 | Parts by Weight |
|---|---|
| Acrylic polymer solution (60% solids prepared above) | 325.54 |
| Butylated melamine formaldehyde resin solution (55.5% solids in butanol of a butylated melamine formaldehyde resin having a viscosity of 377–700 centistokes measured at 25°C. wherein the molar ratio of melamine/formaldehyde/butanol is 1.0/4.8/1.79) | 184.87 |
| Polybutylacrylate solution (10% polymer solids in xylol) | 1.95 |
| A white mill base (prepared above) | 269.80 |
| Portion 2 | |
| Triethylamine | 0.93 |
| Portion 3 | |
| Xylene | 116.32 |
| Methanol | 13.97 |
| Ethylene glycol monoethyl ether acetate | 18.62 |
| TOTAL | 932.00 |

Portion 1 is charged into a mixing vessel and thoroughly blended together and then Portion 2 is added and blended and then Portion 3 is added and the constituents are thoroughly blended together. The resulting coating composition is diluted with toluene to a spray viscosity of 26 seconds using a No. 2 Fisher Cup. A standard spray gun is used to apply the coating composition at a flow rate of about 24 oz. per minute. The composition is applied to a steel panel primed with a 1.5 mil thick iron oxide pigment alkyd resin primer. Only one coat is applied and the panel is baked for about 30 minutes at 125°C. giving a fully cured film about 2.0 mils thick which has the following properties: a good gloss, excellent hardness, resistance to blistering and high humidity, excellent resistance to water soaking, good chip resistance, good solvent resistance and excellent resistance toward deterioration by weathering.

EXAMPLE 2.

A blue mill base is prepared as follows:

| Portion 1 | Parts by Weight |
|---|---|
| Polymer solution (60% polymer solids of a polymer of styrene/butyl acrylate/hydroxyethyl acrylate/acrylic acid, in a weight ratio of 50/38/8/4 having a Gardner Holdt viscosity of X–Z in a solvent blend of xylene and a hydrocarbon solvent having a boiling point of 150–190°C.) | 14.30 |
| Toluene | 5.00 |
| Butyl acetate solution (90% butyl acetate in butanol) | 52.70 |
| Portoin 2 | |
| "Monastral" Blue pigment (phthalocyanine blue pigment) | 8.00 |
| Portion 3 | |
| Polymer solution (described above) | 20.00 |
| TOTAL | 100.00 |

Portion 1 is charged into a vessel and mixed for 15 minutes. Portion 2 is added and mixed for one hour, and Portion 3 is added and mixed for an additional hour. The composition is then ground two passes at 20 gallons per hour in a conventional sand-grinding unit to a fineness of 0.25 mils. The resulting pigment dispersion has a pigment-to-binder ratio of 38.9/100.

A coating composition is prepared as follows:

| Portion 1 | Parts by Weight |
|---|---|
| Acrylic polymer solution (prepared in | |

-Continued

| Portion 1 | Parts by Weight |
|---|---|
| Example 1) Butylated melamine formaldehyde resin solution (described in Example 1) | 425.30 |
| Polybutyl acrylate solution (described in Example 1) | 209.83 |
| White mill base (described in Example 1) | 2.04 |
| Blue mill base (prepared above) | 37.71 |
|  | 36.40 |
| Portion 2 |  |
| Methanol | 16.00 |
| Ethylene glycol monoethyl ether acetate | 18.00 |
| Xylene | 77.82 |
| TOTAL | 823.10 |

The constituents in Portion 1 are added in order to a vessel and thoroughly mixed after each addition. When the addition of constituents is completed, mixing is continued for 15 minutes. Portion 2 is then added and thoroughly mixed to form the novel coating composition.

The resulting coating composition is reduced with toluene to a spray viscosity of 26 seconds measured in a No. 2 Fisher Cup and applied to a primed steel panel as in Example 1 and baked at 125°C. for 30 minutes. The resulting finish is about 2 mils in thickness and has good gloss, good adhesion, good chip resistance, good resistance to solvents and to deterioration from weathering and is an acceptable finish for the exterior of automobile bodies and truck bodies.

The invention claimed is:

1. A thermosetting acrylic enamel coating composition comprising 10–50% by weight of film-forming constituents and correspondingly 90–50% by weight of a solvent for the film-forming constituents; wherein the film-forming constituents consist essentially of an incompatible blend of
   1. 50–85% by weight, based on the weight of the film-forming constituents, of an acrylic polymer consisting essentially of
      a. 30% by weight, based on the weight of the acrylic polymer, of styrene,
      b. 22% by weight, based on the weight of the acrylic polymer, of methyl methacrylate,
      c. 37% by weight, based on the weight of the acrylic polymer, of butyl acrylate,
      d. 10% by weight, based on the weight of the acrylic polymer, of a hydroxy ethyl acrylate,
      e. 1% by weight, based on the weight of the acrylic polymer, of acrylic acid, wherein the acrylic polymer has an acid number of about 1–16 and a relative viscosity of about 1.04–1.10 measured at 25°C. in dichloroethane according to ASTM-D-445-46 T, Method B; and
   2. 15–50% by weight, based on the weight of the film-forming constituents, of a butylated melamine formaldehyde resin in which the molar ratio of melamine/formaldehyde/butanol is ¼–6/1–3 and having a viscosity of 300–800 centistokes measured at 25°C. according to ASTM-D-1545-63.

2. The coating composition of claim 1 containing additionally 0.1–20% by weight pigment.

3. The coating composition of claim 2 which comprises 30–45% by weight of the film-forming constituents and a solvent for the film-forming constituents having a boiling point range of about 130°–170°C.; wherein the film-forming constituents consist essentially of
   1. 60–80% by weight, based on the weight of the film-forming constituents, of the acrylic polymer; and
   2. 40–20% by weight, based on the weight of the film-forming constituents, of a butylated melamine formaldehyde resin having a viscosity of 377–700 centistokes in which the molar ratio of melamine/formaldehyde/butanol is 1.0/4.8/1.79.

4. The coating composition of claim 3 containing up to 20% by weight, based on the weight of the film-forming constituents, of an organic plasticizer.

* * * * *